United States Patent
Cadigan, Jr. et al.

(10) Patent No.: US 9,146,817 B2
(45) Date of Patent: Sep. 29, 2015

(54) DYNAMIC DEFINITION OF ERROR INFORMATION IN A PROGRAMMABLE DEVICE

(71) Applicant: International Business Machines Corporation, Armonk, NY (US)

(72) Inventors: Michael C. Cadigan, Jr., Poughkeepsie, NY (US); Howard M. Haynie, Wappingers Falls, NY (US); Scot H. Rider, Pleasant Valley, NY (US); Mushfiq U. Saleheen, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 261 days.

(21) Appl. No.: 13/798,820

(22) Filed: Mar. 13, 2013

(65) Prior Publication Data

US 2014/0281290 A1  Sep. 18, 2014

(51) Int. Cl.
G06F 13/00 (2006.01)
G06F 13/28 (2006.01)
G06F 11/14 (2006.01)
G06F 11/07 (2006.01)

(52) U.S. Cl.
CPC ........ *G06F 11/1471* (2013.01); *G06F 11/0778* (2013.01); *G06F 11/0787* (2013.01)

(58) Field of Classification Search
CPC .................... G06F 11/0778; G06F 11/0787
See application file for complete search history.

(56) References Cited

U.S. PATENT DOCUMENTS

| | | | | |
|---|---|---|---|---|
| 5,774,745 A | * | 6/1998 | Ecclesine | 710/52 |
| 5,892,954 A | * | 4/1999 | Tomas et al. | 710/200 |
| 7,409,685 B2 | * | 8/2008 | Chen et al. | 717/170 |
| 2008/0082859 A1 | * | 4/2008 | Kondo | 714/8 |
| 2011/0320884 A1 | * | 12/2011 | Thilagar et al. | 714/48 |

* cited by examiner

*Primary Examiner* — Edward Dudek, Jr.
(74) *Attorney, Agent, or Firm* — Cantor Colburn LLP; Steven Chiu

(57) ABSTRACT

Embodiments relate to collecting extended error data from units within a programmable device. A pointer is accessed that points to a region of memory that contains a list of entries that references the extended error data. The list of entries is walked by adjusting a read pointer to obtain the extended error data. The referenced extended error data is moved to an event log.

16 Claims, 3 Drawing Sheets

| Bit(s) | Description |
|---|---|
| (y-1):0 | y-bit address in memory space |
| x:y | size (in defined units, e.g. bytes) of section, or repeat count |
| (x+1) | repeat count flag<br>'0' = bits x:y indicate a size, address is starting address<br>'1' = bits x:y indicate a repeat count, address held |

102

104

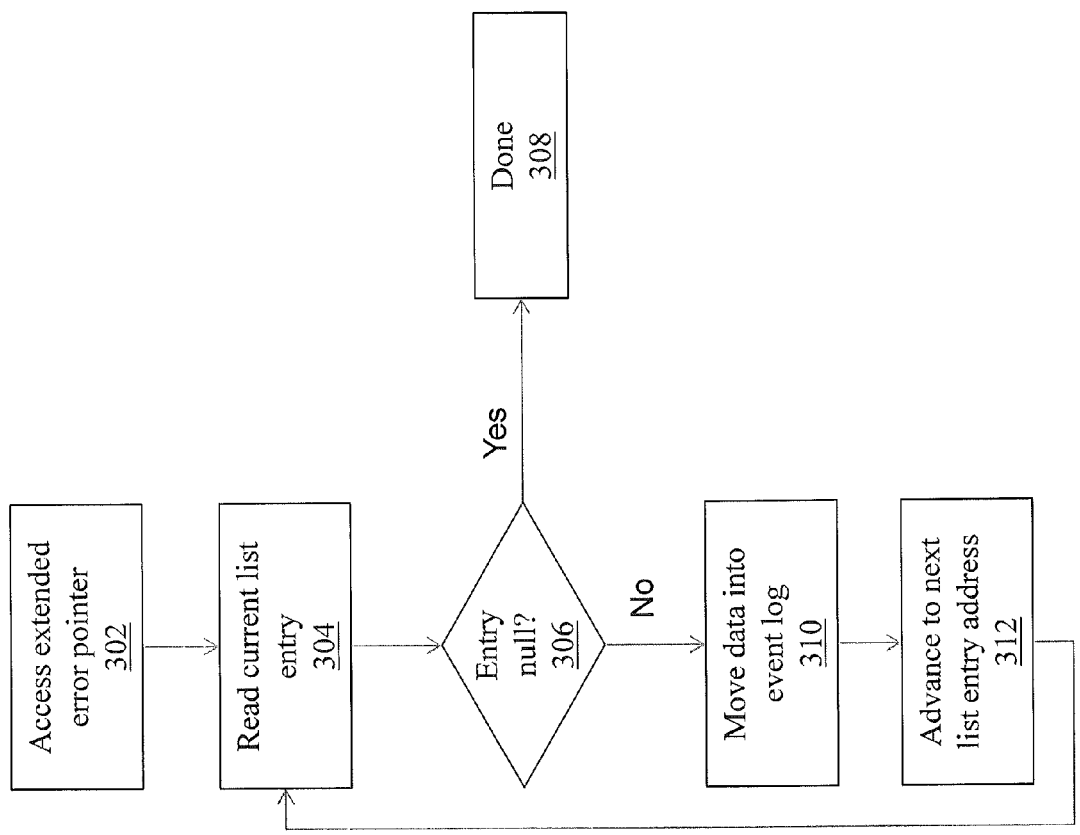

DYNAMIC DEFINITION OF ERROR INFORMATION IN A PROGRAMMABLE DEVICE

BACKGROUND

The present invention relates generally to computing technology, and more specifically to a collection of register data in a programmable device.

Extended error data registers are provided in a programmable device. The registers may be used during boot-up, debug, and maintenance activities. Data or values stored in the registers may be collected by, e.g., software or firmware. The data may be stored in one or more logs, such as an event log.

The software used to collect the data from the registers is typically coded specific to a unit or device. The registers may be present within the programmable device at scattered or various locations based on a specification associated with the programmable device. The specification may be unique to the programmable device and may be updated to reflect device changes. A level of collaboration is therefore required between coders throughout the programmable device product's lifetime for purposes of register data collection.

BRIEF SUMMARY

An embodiment is directed to a method for collecting extended error data from units within a programmable device. The method comprises accessing a pointer that points to a region of memory that contains a list of entries that references the extended error data. The method comprises walking the list of entries by adjusting a read pointer to obtain the extended error data. The method comprises moving, by a controller, the referenced extended error data to an event log.

An embodiment is directed to a programmable device. The programmable device comprises a reserved address that contains a pointer to a region of memory that contains a list of entries that references extended error data. The programmable device comprises a controller configured to adjust a read pointer to point to each of the entries in turn to read the extended error data and move the extended error data to an event log.

An embodiment is directed to a computer program product for collecting extended error data from units within a programmable device. The computer program product comprises a computer readable storage medium having program code embodied therewith. The program code is executable by the programmable device to access a pointer that points to a region of memory that contains a list of entries that references the extended error data. The program code is executable by the programmable device to walk the list of entries by adjusting a read pointer to obtain the extended error data. The program code is executable by the programmable device to move the referenced extended error data to an event log.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 illustrates an exemplary format for a line of memory in accordance with one or more embodiments;

FIG. 3 illustrates a flow chart of an exemplary method in accordance with one or more embodiments.

DETAILED DESCRIPTION

Figure 2:
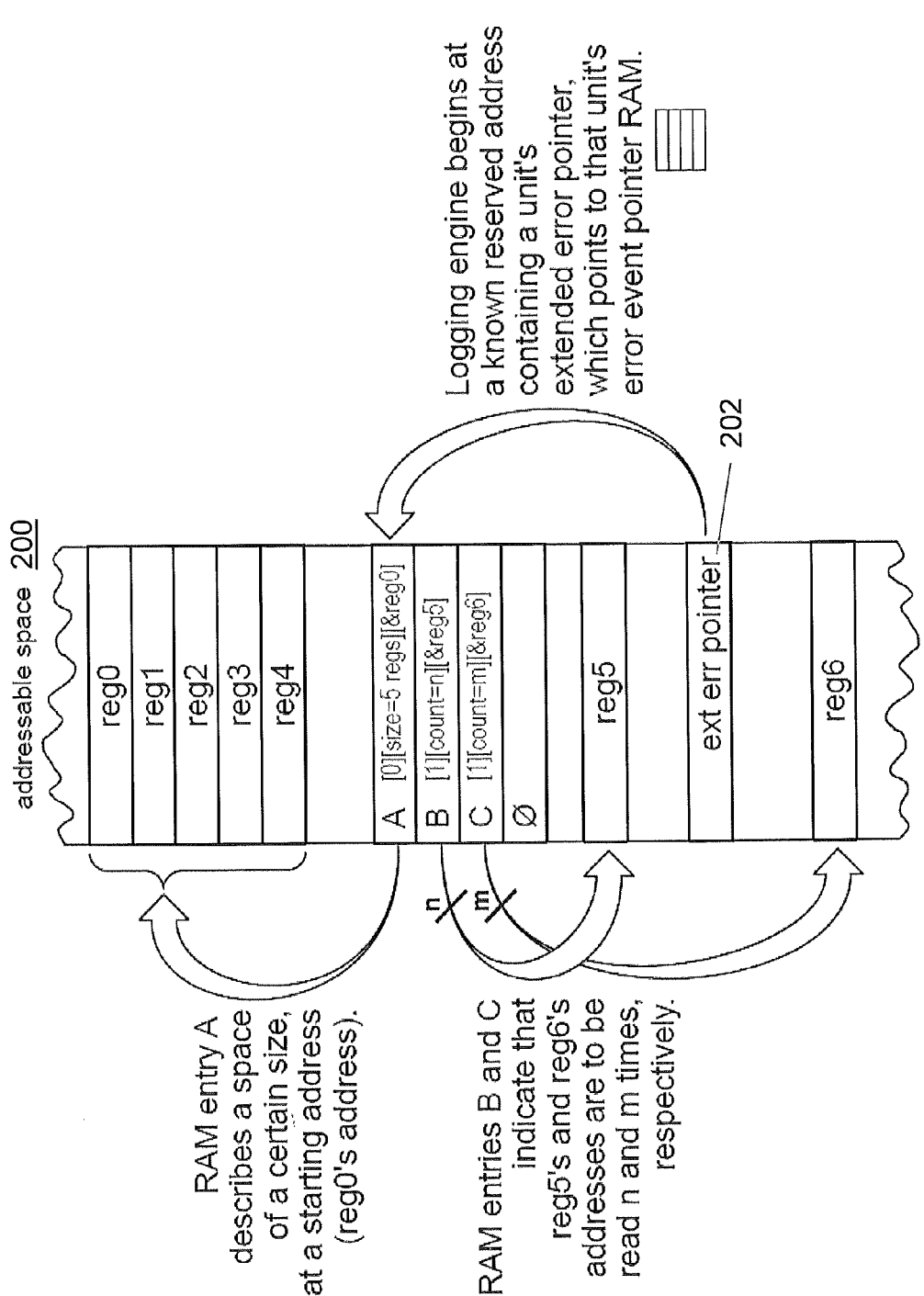
FIG. 2 illustrates an addressable space in accordance with one or more embodiments.

Embodiments described herein are directed to methods, apparatuses, and systems for collecting values from one or more registers or units within a programmable device. Software may be written to access or pull data from the registers without regard for what specific registers are or will be implemented. When registers are later updated or new ones are created, the values within those registers may be obtained automatically (e.g., without having to modify the software).

In some embodiments, a direct memory attachment (DMA) engine or controller located on a programmable device is configured to collect register values (e.g., extended error data register values) and push the values to a predefined memory space. The DMA engine may write-out information or data periodically. For example, the DMA engine may write-out the data as part of a maintenance routine, based on an occurrence of an error condition, or based on any event for which logging may be deemed useful or relevant. In this respect, a need for collaboration between coders may be eliminated, as the programmable device's logging may be self-contained.

In order to facilitate a collection of extended error data (e.g., traces, trap registers, flight recorders, and any other way diagnostic details may be collected in hardware), a mechanism may be provided for each unit to report the location of this data. For each unit, an extended error pointer may indicate an address in a memory space. The address may be associated with a type of memory, such as random access memory (RAM), etc.

The memory may contain a list of addresses and sizes or counts describing all the extended error data that is provided by the unit. Software may parse this "scatter-gather" list and move the data into its event log. The contents of the memory may be part of, or stored with the design data, e.g., in a memory initialization file (MIF). Each address starting at the extended error pointer may be sequentially read until a '0' or 'null' is returned, indicating the end of the list. Units that do not support (or do not yet support) an extended error log may return a '0' or 'null' on the read from the extended error pointer.

The contents of the memory may be initialized based on values embedded in the design or via an initialization file. The initialization file may include a comprehensive set of values or may be as simple as a single null entry. The contents of the memory may be dynamically constructed or updated by the programmable logic during run-time or just prior to an event that is to be captured in a log. This flexibility allows for information collection to be restricted to only that data or information that is relevant to the event/scenario/error/traffic of interest. Such a restriction may be used in embodiments where log space is minimal or limited, or where the time available to log an event is limited (e.g., after a critical event). Such a restriction may be used to allow a larger total information space to be considered relative to a scenario wherein the entire space had to be logged in all instances.

Turning now to FIG. 1, an exemplary format 100 for each line of the memory is shown, with corresponding bit fields or positions 102 and an associated description 104. Each addressable line may have a bit range of [(x+1):0].

As shown in FIG. 1, the repeat count (flag), denoted by bit position 102 equal to (x+1), may provide for interfacing to internal trace units that auto-increment when read. When the repeat count flag is equal to '1', the address (y−1):0 may be reread x:y times. When the repeat count flag is equal to '0', a contiguous block of memory beginning at address (y−1):0 may be read, size x:y.

The ultimate target, the extended error data itself, may be application-specific. Aspects of the disclosure may be used to ensure that the collection algorithm is predictable and common across all units in a programmable device.

Turning now to FIG. 2, an exemplary addressable space 200 in accordance with one or more embodiments is shown. The addressable space 200 may be associated with a programmable device. While the example of FIG. 2 is shown and described below with respect to error event pointer information stored in RAM, the example could be adapted to accommodate other types or forms of memory (e.g., read only memory or ROM).

As shown in FIG. 2, a logging engine (not shown) may begin at a known reserved address containing a unit's extended error pointer (ext err pointer) 202. The ext err pointer 202 may point to that unit's error event pointer RAM, denoted in FIG. 2 by the combination of entries A, B, C, and Ø (null). One or more of the entries A, B, C, and Ø may adhere to the format 100 of FIG. 1 described above.

Entry A may describe a space of a certain size, at a starting address. For example, as shown in FIG. 2, entry A may describe a space of five registers (corresponding to registers zero through four (reg0 through reg4)), starting at the first register (reg0).

Entry B may describe a register that is to be read a number of times. For example, as shown in FIG. 2, entry B may indicate that a particular register (register five (reg5)) is to be read 'n' times.

Entry C may describe a register that is to be read a number of times. For example, as shown in FIG. 2, entry C may indicate that a particular register (register six (regio)) is to be read 'm' times.

Entry Ø (null) may serve to denote the end of the error event pointer RAM.

Turning now to FIG. 3, a flow chart of an exemplary method 300 in accordance with one or more embodiments is shown. The method 300 may be used to collect extended error data register values from units within a programmable device.

In block 302, an extended error pointer may be accessed. The extended error pointer may point to a region of memory (e.g., a region of RAM) that contains a list of addresses and sizes/counts that references the extended error data that is provided by one or more units within a programmable device. As part of block 302, a read pointer that may be used to walk the list may be initialized. For example, the read pointer may be initialized to point to the first entry in the list.

In block 304, entries of said list may be read. The read pointer may be adjusted to accommodate walking the list, to potentially obtain the extended error data. For example, the reads may occur sequentially (e.g., incrementing in terms of the entries in the region of memory). The addresses specified by the entries in the region of memory may contain the extended error data register values of interest.

In block 306, a determination may be made whether the read pointer points to a null entry in the list. If so (e.g., the 'Yes' path is taken out of block 306), flow may proceed from block 306 to block 308 and the method 300 may terminate.

If, in block 306, a determination is made that the read pointer does not point to a null entry in the list (e.g., the 'No' path is taken out of block 306), flow may proceed from block 306 to block 310.

In block 310, a controller or engine (e.g., a logging engine) may move the data at the addresses of block 304 into an event log.

In block 312, the read pointer may be adjusted to advance to the next list entry address. Flow may then proceed from block 312 to block 304.

Technical effects and benefits include a reduction in development time (e.g., software development time) relative to conventional techniques. Aspects of the disclosure may be used to eliminate a need to provide for software updates as a programmable device is updated, even as a follow-on or subsequent version of the programmable device becomes available.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for collecting extended error data from units within a programmable device, comprising:
    accessing a pointer that points to a region of memory that contains a list of entries that references the extended error data;
    walking the list of entries by adjusting a read pointer to obtain the extended error data; and
    moving, by a controller, the referenced extended error data to an event log
    wherein:
        at least one of the entries comprises a first field that indicates an address associated with the extended error data, a second field that indicates whether a third field indicates a size or a repeat count, and the third field; and
        when the second field indicates that the third field indicates a repeat count, extended error data associated with the at least one entry is read from the address indicated in the first field a number of times corresponding to the repeat count.

2. The method of claim 1, where the memory is a random access memory (RAM).

3. The method of claim 1, wherein the pointer is located at a known reserved address.

4. The method of claim 1, wherein contents of the region of memory are initialized using embedded values.

5. The method of claim 1, wherein contents of the region of memory are initialized using an initialization file.

6. The method of claim 1, wherein contents of the region of memory are updated by programmable logic included in the programmable device during run-time or prior to an event for which a log is to be captured.

7. The method of claim 1, wherein when the second field indicates that the third field indicates a size, extended error data associated with the at least one entry is read starting with the address indicated in the first field and ends at an address based on the size indicated by the third field.

8. The method of claim 1, wherein adjusting the read pointer comprises incrementing the read pointer in order to sequentially point to each of the entries.

9. A programmable device, comprising:
- a reserved address that contains a pointer to a region of memory that contains a list of entries that references extended error data; and
- a controller configured to adjust a read pointer to point to each of the entries in turn to read the extended error data and move the extended error data to an event log wherein:
- at least one of the entries comprises a first field that indicates an address associated with the extended error data, a second field that indicates whether a third field indicates a size or a repeat count, and the third field; and
- when the second field indicates that the third field indicates a repeat count, extended error data associated with the at least one entry is read from the address indicated in the first field a number of times corresponding to the repeat count.

10. The programmable device of claim 9, wherein contents of the region of memory are initialized based on embedded values.

11. The programmable device of claim 9, wherein contents of the region of memory are initialized based on an initialization file.

12. The programmable device of claim 9, further comprising:
- programmable logic configured to update contents of the region of memory during run-time or prior to an event for which a log is to be captured.

13. The programmable device of claim 9, wherein when the second field indicates that the third field indicates a size, extended error data associated with the at least one entry is read starting with the address indicated in the first field and ends at an address based on the size indicated by the third field.

14. The programmable device of claim 9, wherein adjusting the read pointer comprises incrementing the read pointer in order to sequentially point to each of the entries.

15. The programmable device of claim 9, wherein one of the entries comprises a null character that indicates an end to the references to the extended error data.

16. A computer program product for collecting extended error data from units within a programmable device, the computer program product comprising:
- a non-transitory computer readable storage medium having program code embodied therewith, the program code executable by the programmable device to:
  - access a pointer that points to a region of memory that contains a list of entries that references the extended error data,
  - walk the list of entries by adjusting a read pointer to obtain the extended error data, and
  - move the referenced extended error data to an event log, wherein:
- at least one of the entries comprises a first field that indicates an address associated with the extended error data, a second field that indicates whether a third field indicates a size or a repeat count, and the third field; and
- when the second field indicates that the third field indicates a repeat count, extended error data associated with the at least one entry is read from the address indicated in the first field a number of times corresponding to the repeat count.

* * * * *